United States Patent [19]

Izuno et al.

[11] 4,335,917
[45] Jun. 22, 1982

[54] RECLINING ARRANGEMENT

[75] Inventors: Sadami Izuno; Isao Kiyomitsu, both of Hiroshima, Japan

[73] Assignees: Toyo Kogyo Co., Ltd.; Delta Kogyo Co., Ltd., both of Hiroshima, Japan

[21] Appl. No.: 81,617

[22] Filed: Oct. 3, 1979

[30] Foreign Application Priority Data

Oct. 3, 1978 [JP] Japan ............... 53/136460[U]

[51] Int. Cl.³ ............................................ A47C 1/024
[52] U.S. Cl. ..................................... 297/366; 297/354
[58] Field of Search ......... 297/361, 354, 355, 366–369

[56] References Cited

U.S. PATENT DOCUMENTS

| 2,572,149 | 10/1951 | Hind et al. ............... 297/361 X |
| 3,635,525 | 1/1972 | Magyar ........................ 297/354 |
| 3,736,025 | 5/1973 | Ziegler et al. ............... 297/369 |
| 4,008,920 | 2/1977 | Arndt ......................... 297/361 |

FOREIGN PATENT DOCUMENTS 2459070  6/1975  Fed. Rep. of Germany ...... 297/366

Primary Examiner—William E. Lyddane
Attorney, Agent, or Firm—Wenderoth, Lind & Ponack

[57] ABSTRACT

A reclining arrangement for a seat or the like including a seat back reclinably mounted to a seat cushion through a reclining knuckle having a rough adjusting mechanism for roughly adjusting, stepwise, the folding angle of said seat back with respect to said seat cushion. The reclining arrangement includes a first arm of the reclining knuckle selectively fixed to either one of the seat back or seat cushion, a second arm of the reclining knuckle pivotally connected to the remaining one of the seat back or seat cushion, and a fine adjusting mechanism so provided as to adjust the angle of rotation of the second arm, the rough adjusting mechanism being disposed to be spaced a predetermined distance from the fine adjusting mechanism.

20 Claims, 7 Drawing Figures

RECLINING ARRANGEMENT

BACKGROUND OF THE INVENTION

The present invention relates to a reclining arrangement and more particularly, to a reclining arrangement of a seat or the like for use, for example, in motor vehicles, etc.

Conventionally, there has been proposed, for example, in Japanese Utility Model Publication Jitsukosho No. 45-5464, a reclining arrangement having a mechanism for roughly adjusting, stepwise, the folding angle of a seat back for a seat of a motor vehicle or the like, and another mechanism for finely adjusting continuously, the folding angle of such a seat back.

The known reclining arrangement as described above, however, has such disadvantages that, since both the rough adjusting mechanism and fine adjusting mechanism are incorporated therein so as to be associated with each other, a rough adjusting mechanism already provided for the seat, i.e. the existing rough adjusting mechanism, can not be utilized as it is, thus requiring replacement by new mechanisms capable of rough and fine adjustments. Furthermore, the mounting of these new mechanisms is rather difficult, and they require an expert for repairing them in the case of troubles and the like.

SUMMARY OF THE INVENTION

Accordingly, an essential object of the present invention is to provide an improved reclining arrangement for a seat or the like for use, for example, in motor vehicles, etc., in which a fine adjusting mechanism can be incorporated apart from an existing rough adjusting mechanism without necessity of altering or remodelling the existing rough adjusting mechanism to a large extent, with substantial elimination of disadvantages inherent in the conventional reclining arrangement intended for rough and fine adjustments as described earlier.

Another important object of the present invention is to provide an improved reclining arrangement of the above described type which is simple in construction and easy in assembly, and can be readily incorporated into various motor vehicles, etc. at low cost.

In accomplishing these and other objects, according to the present invention, there is provided a reclining arrangement for a seat or the like including a seat back reclinably mounted to a seat cushion through a reclining knuckle having a rough adjusting mechanism for roughly adjusting, stepwise, the folding angle of the seat back with respect to the seat cushion. The reclining arrangement includes a first arm of the reclining knuckle selectively fixed to either one of the seat back or seat cushion, a second arm of the reclining knuckle pivotally connected to the remaining one of the seat back or seat cushion, and a fine adjusting mechanism so provided as to adjust the angle of rotation of the second arm, the rough adjusting mechanism being disposed to be spaced a predetermined distance from the fine adjusting mechanism.

By the arrangement according to the present invention as described below, the existing reclining arrangement having the rough adjusting mechanism may be utilized without alteration or remodelling to a large extent, and thus the cost for installation is appreciably reduced. Moreover, since the reclining arrangement according to the present invention has a simple construction, the efficiency of the assembly thereof for installation has been markedly improved.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
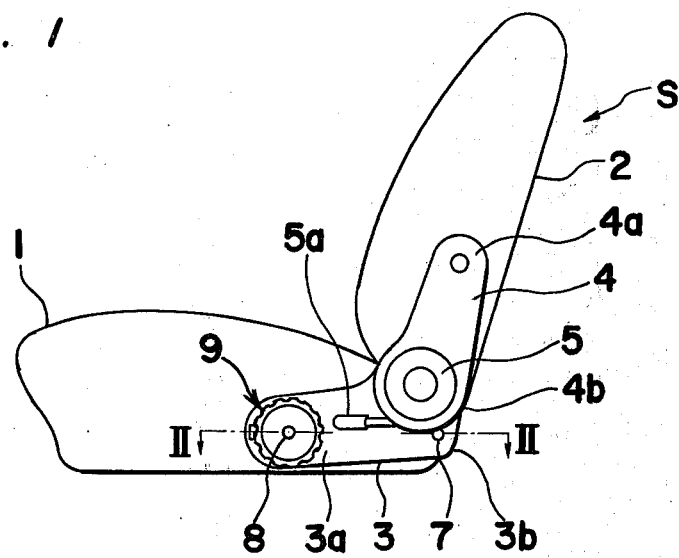
FIG. 1 is a schematic side elevational view of a reclining seat to which the reclining arrangement according to the present invention may be applied.

Referring now to the drawings, there is shown in FIG. 1 a reclining seat S in which a reclining arrangement according to the present invention is incorporated. The reclining seat S generally includes a seat cushion 1 horizontally disposed, for example, on a floor of a motor vehicle body (not shown), a seat back 2 disposed to extend upwardly from the rear portion of the seat cushion 1, a cushion arm 3 supported, at one end 3a, by a seat frame 6 (FIG. 2) of the seat cushion 1 in a manner as described in detail later, and a back arm 4 fixed, at its upper end 4a, to a seat frame (not shown) of the seat back 2, with the lower portion 4b of said arm 4 being pivotally connected to the other end 3b of the cushion arm 3 through a known rough adjusting mechanism 5 thereby to constitute a reclining knuckle. The rough adjusting mechanism 5 may be of any known type for roughly adjusting stepwise, the folding angle of the back arm 4 with respect to the cushion arm 3, and is provided, for example, with a lever 5a for operation thereof, although a detailed description of the rough adjusting mechanism 5 is omitted here for brevity. More specifically, as shown in FIG. 2, the cushion arm 3 is pivotally connected, at its portion adjacent to the end 3b thereof, to the seat frame 6 of the seat cushion 1 by a bolt 7, while the end 3a of the cushion arm 3 is supported, through a fine adjusting mechanism 9, by a support shaft 8 secured to and extending outwardly from the seat frame 6 of the seat cushion 1.

Figure 5:
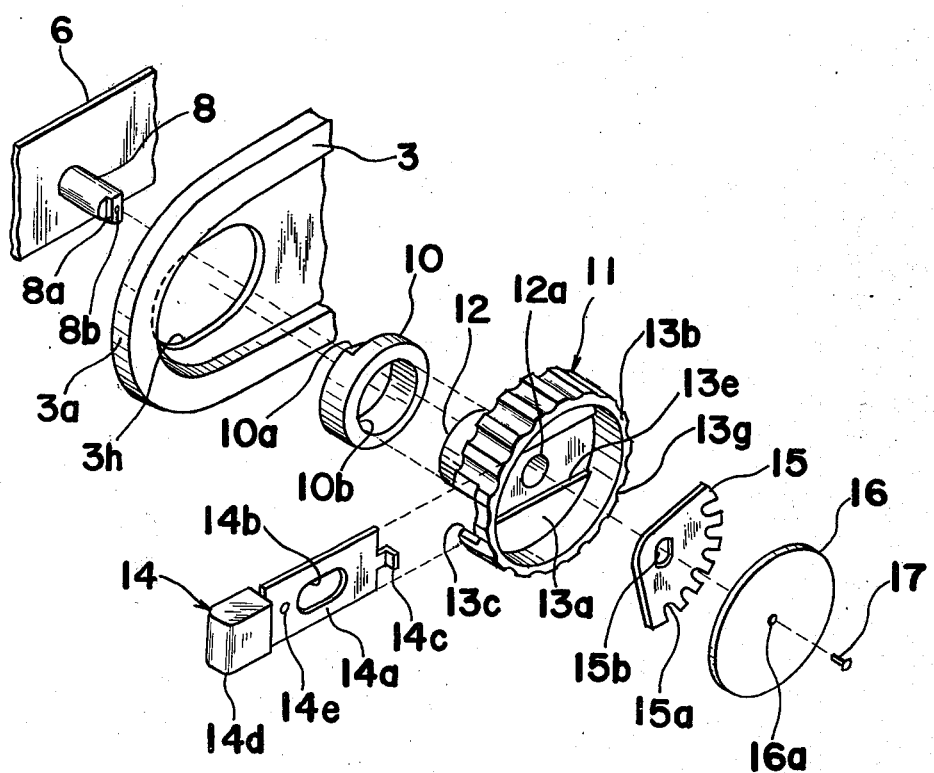
FIG. 5 is an exploded view, partly broken, of a fine adjusting mechanism employed in the arrangement of FIG. 2, and FIGS. 6 and 7 are views similar to FIGS. 2 and 3.

Referring also to FIG. 5, the fine adjusting mechanism 9 generally includes a short cylindrical slide block 10, an operating dial or knob 11, a lock lever 14, a lock plate 15 of sector shape, and a circular cover plate 16 which are assembled or combined in a manner as described hereinbelow.

The cushion arm 3 has an elongated opening 3h formed in a position adjacent to the end 3a thereof, while the slide block 10 having a central opening 10b at its front portion is formed, at the rear portion thereof, with a sliding portion 10a having a configuration which is slidably received in said elongated opening 3h for sliding movement therein. The operating dial 11 further includes a circular bottom portion 13a and a flange portion 13b extending forwardly from the peripheral edge of the bottom portion 13a and provided with a number of holding grooves 13g formed in the outer periphery thereof parallel to the axis thereof, and an eccentric cam portion 12 extending rearwardly from the bottom portion 13a and having a shaft bore 12a eccentrically formed therein to extend through the central portion of said bottom portion 13a so as to allow the support shaft 8 projecting outwardly from the seat frame 6 to sequentially pass through the opening 3h of the cushion arm 3, opening 10b of the slide block 10 and the shaft bore 12a of the cam portion 12. At one part on the outer periphery of the operating dial 11 between the bottom portion 13a and flange portion 13b thereof, there is formed a notch or cut out portion 13c, while a lever engaging groove or recess 13e is formed in the bottom portion 13a in the diametrical direction thereof as shown to receive the lock lever 14 therein. The lock lever 14 includes a rectangular plate portion 14a which can be slidably accommodated in the engaging recess 13e, an elongated opening 14b having a width approximately equal to the diameter of the support shaft 8 and which is formed in approximately the central portion in the longitudinal direction of the plate portion 14a, a hook 14c formed at one end of the plate portion 14a, a knob 14d fixed to the other end of said plate portion 14a and a pin 14e provided on the plate portion 14a between the knob 14d and opening 14b. The lock plate 15 of sector shape is provided, along its arcuate peripheral edge, with a number of notches or concave portions 15a engageable with the hook 14c of the lock lever 14, and is provided, in its base portion, with a rectangular or elongated opening 15b engageable with a corresponding protrusion 8a provided at the distal end of the support shaft 8 for fixedly mounting the lock plate 15 on said shaft 8.

Figure 2:
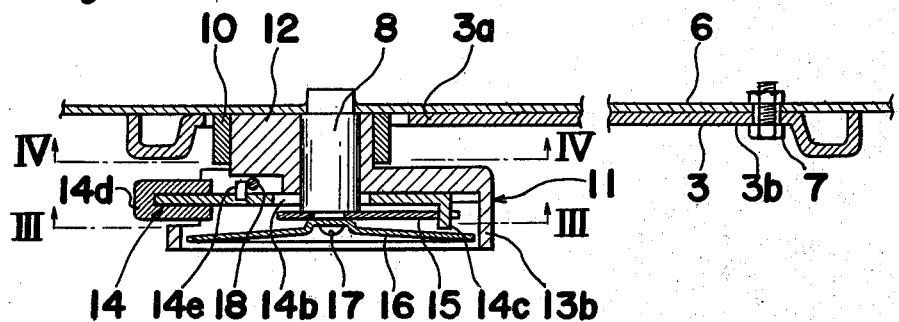
FIG. 2 is a cross section taken along the line II—II of FIG. 1 and shown on an enlarged scale.
Figure 3:
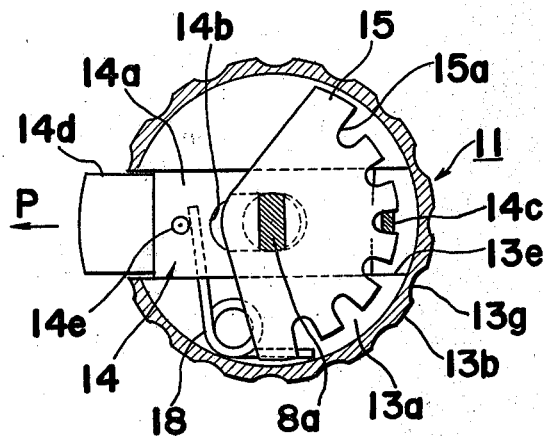
FIG. 3 is a cross section taken along the line III—III of FIG. 2.
Figure 4:
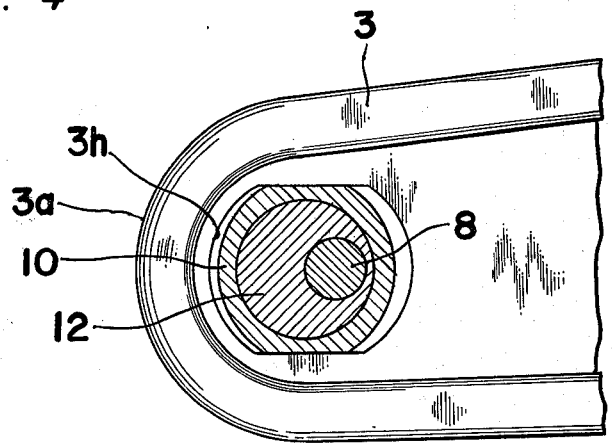
FIG. 4 is a cross section taken along the line IV—IV of FIG. 2.

Referring particularly to FIGS. 2 to 4, assembling of the fine adjusting mechanism 9 will be described hereinbelow.

The sliding portion 10a of the slide block 10 is engaged with the opening 3h of the cushion arm 3, and the eccentric cam portion 12 of the operating dial 11 is fitted into the opening 10b of the slide block 10. Subsequently, the rectangular plate portion 14a of the lock lever 14 is inserted into the engaging recess 13e through the cut out portion 13c of the operating dial 11, and then, the support shaft 8 secured to the seat frame 6 is passed through the opening 12a of the cam portion 12 and the elongated opening 14b of the lock lever 14, with the protrusion 8a of the support shaft 8 being fitted into the corresponding opening 15b of the lock plate 15. Furthermore, a screw 17 passed through a fixing opening 16a formed at the central portion of the circular cover plate 16 is threaded into a threaded hole 8b provided in the protrusion 8a of the support shaft 8, and thus, the respective parts for the fine adjusting mechanism 9 are assembled into one unit. It is to be noted here that the lock lever 14 is normally urged in a direction indicated by an arrow P in FIG. 3 by a torsion spring 18 engaged, at its one end, with the bottom portion 13a and flange portion 13b of the operating dial 11 and, at the other end thereof, with the pin 14e secured on the rectangular plate portion 14a of the lock lever 14, and by the engagement of the hook 14c of the lever 14 with one of the notches 15a of the lock plate 15, the fine adjusting mechanism 9 is locked.

By the above arrangement, when the rough adjusting mechanism 5 is operated in the state where the fine adjusting mechanism 9 is locked as described above, the back arm 4 is moved stepwise for inclination with respect to the cushion arm 3. For slightly changing the angle of inclination, the lock lever 14 is depressed at the knob 14d in the direction opposite to that indicated by the arrow P in FIG. 3 against the urging force of the torsion spring 18 so as to disengage the hook 14c of the lock lever 14 from the notch 15a of the lock plate 15 for establishing an unlocked state, and subsequently, upon rotating the operating dial 11 by holding the flange portion 13b thereof, the slide block 10 pushes the cushion arm 3 up or down as the sliding portion 10a slides in the opening 3h of the cushion arm 3 through eccentric rotation of the eccentric cam portion 12 of the operating dial 11. In the above case, since the cushion arm 3 and back arm 4 are in the locked state, the angle of inclination of the back arm 4 is altered by a number of degrees equivalent to the above angle of rotation of the cushion arm 3, and thus, the angle of inclination of the seat back 2 with respect to the seat cushion 1 can be adjusted to a small extent. When the lock lever 14 is released from the manual depression after the fine adjustment has been made as described above, the lock lever 14 is moved in the direction of the arrow P by the urging force of the torsion spring 18, and the hook 14c of the lock lever 14 engages a different notch 15a of the lock plate 15 for locking the mechanism.

It should be noted here that, in the foregoing embodiment, although the description is mainly related to the reclining arrangement in which the back arm 4 is fixed to the seat frame of the seat back 2, with the fine adjusting mechanism 9 being provided on the cushion arm 3 pivotally connected to the seat frame 6 of the seat cushion 1, the arrangement may be so modified that the cushion arm 3 is fixed to the seat frame 6, with the fine adjusting mechanism 9 being provided on the back arm 4 pivotally mounted to the seat frame of the seat back 2.

Figure 6:
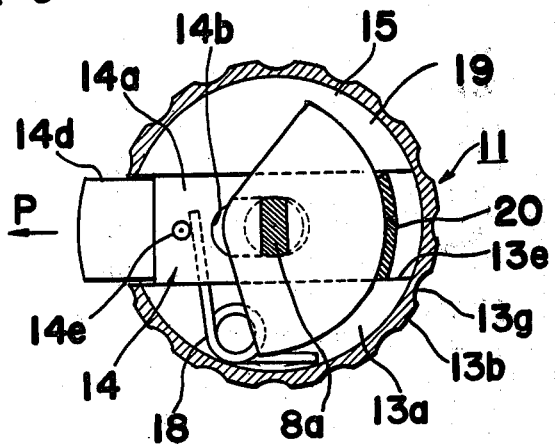
Figure 7:
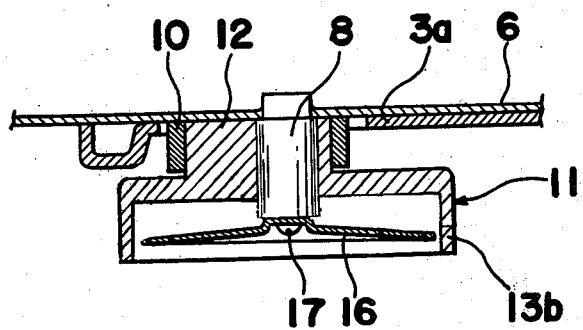

It should also be noted that, the fine adjusting mechanism 9, described as being brought into the locked state by the engagement of the hook 14c of the lock lever 14 and the corresponding notch 15a of the lock plate 15 in the foregoing embodiment, may be modified to establish the locked state by frictional engagement, for example, between the arcuate edge 19 of the lock plate 15 and corresponding end 20 of the lock lever 14 (FIG. 6) for a completely continuous adjustment by the fine adjusting mechanism 9, and that, if the frictional resistance between the slide block 10 and eccentric cam portion 12 is properly selected, the lock plate 15 and lock lever 14 as described above may be dispensed with (FIG. 7).

It should further be noted that, although the present invention is mainly described with reference to a seat for a motor vehicle in the foregoing embodiment, the concept of the present invention is not limited in its application to seats for motor vehicles alone, but may readily be applicable, for example, to seating or bed arrangements for railroad trains, air crafts, ships, and the like or to those for household use.

As is clear from the foregoing description according to the present invention, in the reclining seat in which the seat back is attached to the seat cushion for inclination as desired, through the reclining knuckle having the rough adjusting mechanism for adjusting the folding angles step by step, one arm of the reclining knuckle is fixed to either one of the seat back or seat cushion, while the other arm of the reclining knuckle is pivotally connected to the other one of the seat back or seat through the mechanism for finely adjusting the rotational angle of said other arm, with said fine adjusting mechanism being spaced a predetermined distance from the rough adjusting mechanism. Therefore, the fine adjusting mechanism for continuously adjusting the folding angle may be separately provided without much alteration or remodelling of the already-provided or existing rough adjusting mechanism for adjusting the folding angle stepwise, and thus, it has been made possible to readily effect the rough and fine adjustments in an efficient manner. Furthermore, according to the present invention, since the fine adjusting mechanism is constructed through utilization of the eccentric cam, the structure thereof can be simplified, with consequent compact size and reduction in cost.

Although the present invention has been fully described by way of example with reference to the attached drawings, it is to be noted that various changes and modifications are apparent to those skilled in the art. Therefore, unless otherwise such changes and modifications depart from scope of the present invention, they should be construed as included therein.

What is claimed is:

1. A reclining arrangement for a seat having a seat back reclinably mounted with respect to a seat cushion, which comprises:
    a first arm fixed at a first end thereof to one of said seat back and said seat cushion;
    a second arm;
    a shaft pivotally connecting said second arm to the other of said seat back and said seat cushion at a point adjacent a first end of said second arm;
    a rough adjusting mechanism pivotably connecting the second end of said first arm to said first end of said second arm for stepwise rough adjustment of the folding angle of said seat back with respect to said seat cushion; and
    a fine adjusting mechanism for mounting the second end of said second arm on said other of said seat back and said seat cushion and for rotating said second arm about said shaft to adjust the angle formed about said shaft between said second arm and said other of said seat back and said seat cushion.

2. A reclining arrangement as claimed in claim 1, wherein said first end of said first arm is fixed to said seat back, and said second arm is pivotally connected adjacent said first end thereof to said seat cushion by means of said shaft, said fine adjusting mechanism pivotably mounting said second end of said second arm on said seat cushion.

3. A reclining arrangement as claimed in claim 2, wherein a support shaft is fixed to said seat cushion, and said fine adjusting mechanism includes a cam member rotatably mounted on said support shaft, said cam member engaging said second end of said second arm, and means cooperating with said cam member for releasably locking said second arm in position.

4. A reclining arrangement as claimed in claim 3, wherein said locking means includes a locking plate secured to a distal end of said support shaft and provided, at its peripheral edge, with a plurality of notches each engageable with a hook of a lock lever associated in its movement with the rotation of said cam member.

5. A reclining arrangement as claimed in claim 3, wherein said locking means includes a locking plate secured to a distal end of said support shaft and arranged to frictionally contact, at its peripheral edge, an end edge of a lock lever associated in its movement with the rotation of said cam member.

6. A reclining arrangement as claimed in claim 3, wherein said cam member is engaged with said second arm through a slide block, with frictional resistance between said slide block and said cam member being so determined that said slide block and said cam member serve as said locking means.

7. A reclining arrangement as claimed in claim 1, wherein said first end of said first arm is fixed to said seat cushion, and said second arm is pivotably connected adjacent said first end thereof to said seat back by means of said shaft, said fine adjusting mechanism pivotably mounting said second end of said second arm on said seat back.

8. A reclining arrangement as claimed in claim 7, wherein a support shaft is fixed to said seat back, and said fine adjusting mechanism includes a cam member rotatably mounted on said support shaft, said cam member engaging said second end of said second arm, and means cooperating with said cam member for releasably locking said second arm in position.

9. A reclining arrangement as claimed in claim 8, wherein said locking means includes a locking plate secured to a distal end of said support shaft and provided, at its peripheral edge, with a plurality of notches each engageable with a hook of a lock lever associated in its movement with the rotation of said cam member.

10. A reclining arrangement as claimed in claim 8, wherein said locking means includes a locking plate secured to a distal end of said support shaft and arranged to frictionally contact, at its peripheral edge, an end edge of a lock lever associated in its movement with the rotation of said cam member.

11. A reclining arrangement as claimed in claim 8, wherein said cam member is engaged with said second arm through a slide block, with frictional resistance between said slide block and said cam member being so determined that said slide block and said cam member serve as said locking means.

12. A reclining arrangement for a seat, the seat including a seat back reclinable with respect to a seat cushion, comprising:
    a reclining knuckle reclinably mounting said seat back on said seat cushion so as to permit changing the folding angle between said seat back and said seat cushion, said reclining knuckle having a first arm fixed to one of said seat back and said seat cushion, a second arm pivotably connected to said first arm, said second arm also being pivotably connected to the other of said seat back and said seat cushion so as to be pivotable about a pivot point, and a rough adjusting mechanism cooperating with said arms for stepwise rough adjustment of the angle between said first arm and said second arm; and
    a fine adjusting mechanism positioned on said second arm for adjusting the angle formed about said pivot point between said second arm and said other of said seat back and said seat cushion.

13. A reclining arrangement as claimed in claim 12, wherein said fine adjusting mechanism comprises a cam member, locking means and operating knob, said cam member being engaged with said second arm for permitting adjusting said angle formed about said pivot point between said second arm and said other of said seat back and said seat cushion, said operating knob being connected to said cam member for operating said cam member, and said locking means cooperating with said cam member for fixing the angle between said second arm and said other of said seat back and said seat cushion.

14. A reclining arrangement as claimed in claim 13, wherein said first arm is fixed to said seat back, said second arm is connected to said seat cushion through said pivot point and said fine adjusting mechanism, a support shaft is fixed to and extends outwardly from said seat cushion, said cam member is rotatably mounted on said support shaft, and said locking means cooperates with said cam member for locking the rotational positions of said cam member about said support shaft.

15. A reclining arrangement as claimed in claim 14, wherein said second arm has an opening for receiving said support shaft and said cam member, said cam member being engaged with said opening and rotatable about said support shaft for permitting changing the position of said opening in relation to said support shaft.

16. A reclining arrangement as claimed in claim 15, wherein said locking means includes a lock lever provided with a hook and associated in its movement with the rotation of said cam member, and a locking plate secured to a distal end of said support shaft and provided at its peripheral edge with a plurality of notches each engageable with said hook of said lock lever.

17. A reclining arrangement as claimed in claim 13, wherein said first arm is fixed to said seat cushion, said second arm is connected to said seat back through said pivot point and said fine adjusting mechanism, a support shaft is fixed to and extends outwardly from said seat back, said cam member is rotatably mounted on said support shaft, and said locking means cooperates with said cam member for locking the rotational positions of said cam member about said support shaft.

18. A reclining arrangement as claimed in claim 17, wherein said second arm has an opening for receiving said support shaft and said cam member, said cam member being engaged with said opening and rotatable about said support shaft for permitting changing the position of said opening in relation to said support shaft.

19. A reclining arrangement as claimed in claim 17, wherein said locking means includes a lock lever provided with a hook and associated in its movement with the rotation of said cam member, and a locking plate secured to a distal end of said support shaft and provided at its peripheral edge with a plurality of notches each engageable with said hook of said lock lever.

20. A reclining arrangement for a seat, the seat including a seat back reclinable with respect to a seat cushion, comprising:
  a reclining knuckle reclinably mounting said seat back on said seat cushion so as to permit changing the folding angle between said seat back and said seat cushion, said reclining knuckle having a first arm fixed to said seat back, a second arm pivotably connected to said first arm, said second arm also being pivotably connected to said seat cushion so as to be pivotable about a pivot point, and a rough adjusting mechanism cooperating with said arms for stepwise rough adjustment of the angle between said first arm and said second arm; and
  a fine adjusting mechanism positioned on said second arm for adjusting the angle formed about said pivot point between said second arm and said seat cushion, said second arm also being connected to said seat cushion through said fine adjusting mechanism, said fine adjusting mechanism comprising a cam member, locking means and operating knob, said cam member being engaged with said second arm for permitting adjusting said angle formed about said pivot point between said second arm and said seat cushion, said operating knob being connected to said cam member for operating said cam member, and said locking means cooperating with said cam member for fixing the angle between said second arm and said seat cushion, said fine adjusting mechanism being provided at one end of said second arm so as to be spaced away from said pivot point.

* * * * *